Dec. 31, 1968   H. S. HARRISON   3,418,947
OVERLOAD RELEASE FOR A CONVEYOR DRIVE AND THE LIKE
Filed Aug. 1, 1966

INVENTOR.
HOMER S. HARRISON
BY
Barnes, Kisselle, Raisch & Choate
ATTORNEYS

Dec. 31, 1968 H. S. HARRISON 3,418,947
OVERLOAD RELEASE FOR A CONVEYOR DRIVE AND THE LIKE
Filed Aug. 1, 1966

INVENTOR.
HOMER S. HARRISON
BY
Barnes, Kisselle, Raisch & Choate
ATTORNEYS

INVENTOR.
HOMER S. HARRISON
BY
Barnes, Kisselle, Raisch & Choate
ATTORNEYS

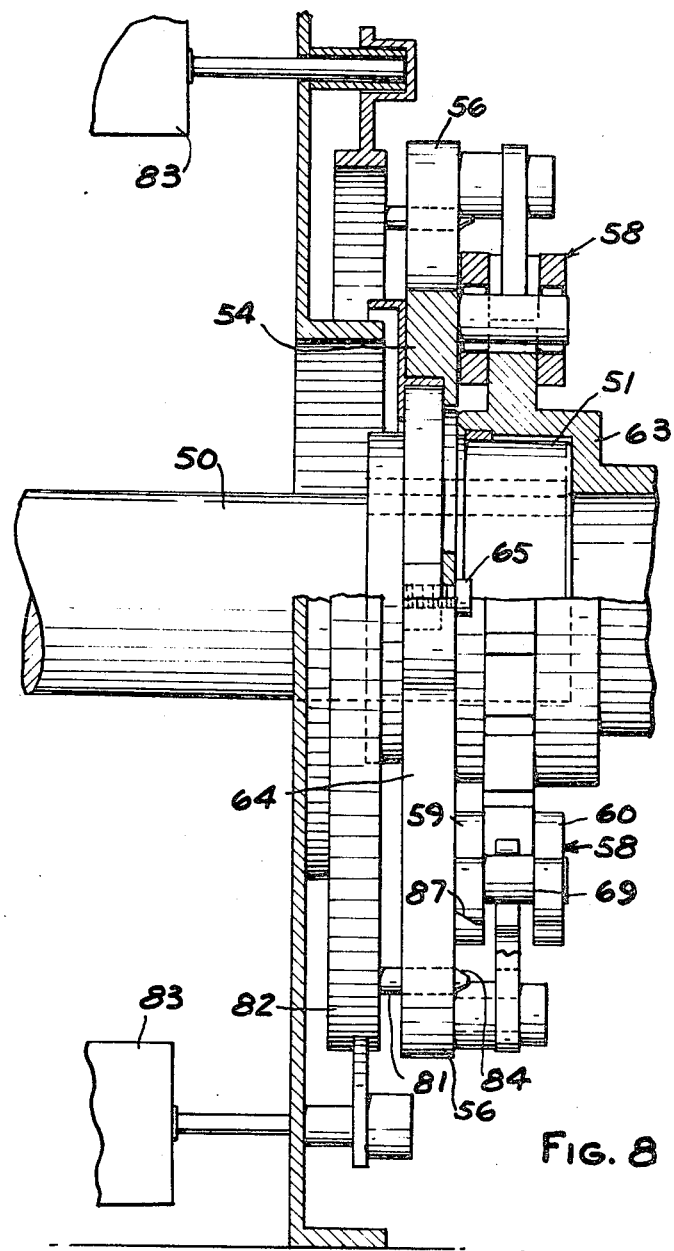
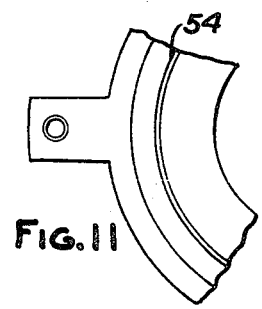
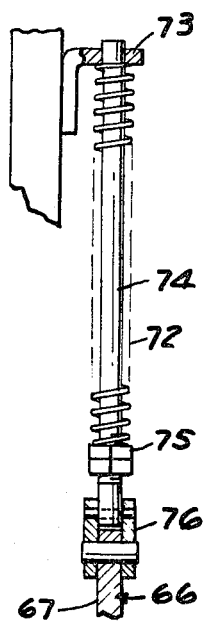
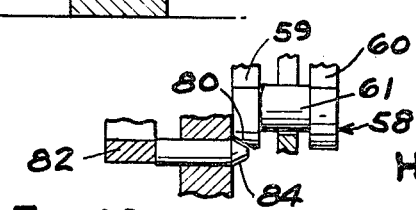

United States Patent Office 3,418,947
Patented Dec. 31, 1968

3,418,947
OVERLOAD RELEASE FOR A CONVEYOR DRIVE AND THE LIKE
Homer S. Harrison, Detroit, Mich., assignor to Mechanical Handling Systems, Inc., Warren, Mich., a corporation of Michigan
Filed Aug. 1, 1966, Ser. No. 569,128
19 Claims. (Cl. 104—172)

ABSTRACT OF THE DISCLOSURE

An overload release for a conveyor drive and the like which comprises a rotatable drive member, a driven member mounted for rotation about the axis of the drive member and at least one latch pivoted to the drive member. When the latch is in one position, a portion thereof engages a portion of the driven member and is yieldingly held in engagement therewith. When an excessive load is placed upon the driven member, continued rotation of the drive member causes the latch member to move out of engagement with the driven member.

---

This invention relates to conveyor drives and particularly conveyor drives for power and free conveyor systems.

In power and free conveyor systems, it is conventional to drive a conveyor chain with pusher members thereon and cause said pusher members to periodically engage carriers and move them along a track. Such systems are subject to erratic, fluctuating and sudden loads and it has been common to provide the conveyor chain drive with shear pins or the like as a safety measure in case of overloading of the system. This effectively safeguards and protects the system, but every time the shear pin is broken, it is necessary that the conveyor system be interrupted and the shear pin replaced. Obviously, this necessitates a shutdown for a substantial length of time.

It is an object of this invention to provide an overload release for conveyor drives and the like which does not necessitate the replacement of any parts in order to reestablish the driving connection, which is relatively simple, which can be reset without the use of tools and which can be adjusted readily to change the load under which the overload release operates.

In the drawings:

FIG. 8 is a fragmentary sectional view taken along the line 8—8 in FIG. 6.

FIG. 9 is a fragmentary sectional view taken along the line 9—9 in FIG. 6.

FIG. 10 is a fragmentary sectional view taken along the line 10—10 in FIG. 7.

FIG. 11 is a fragmentary plan view of a portion of the system.

Figure 1:
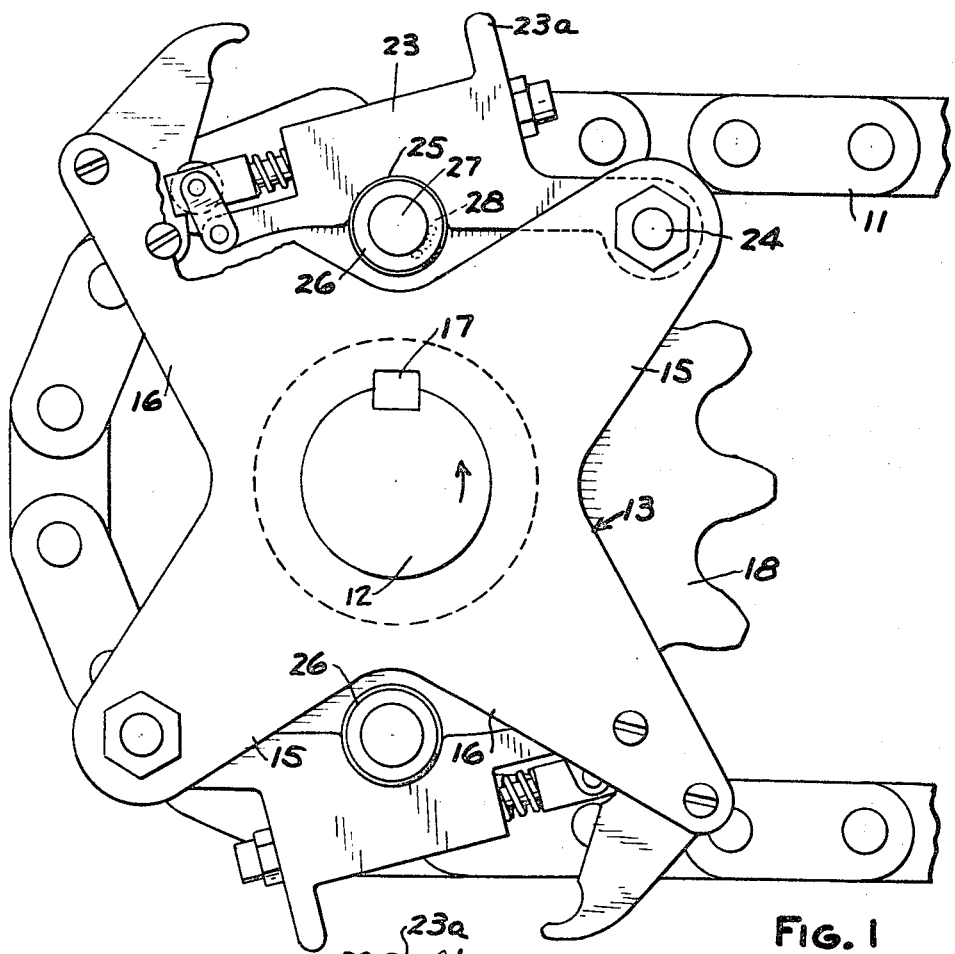
FIG. 1 is a fragmentary plan view of a drive system embodying the invention.
Figure 3:
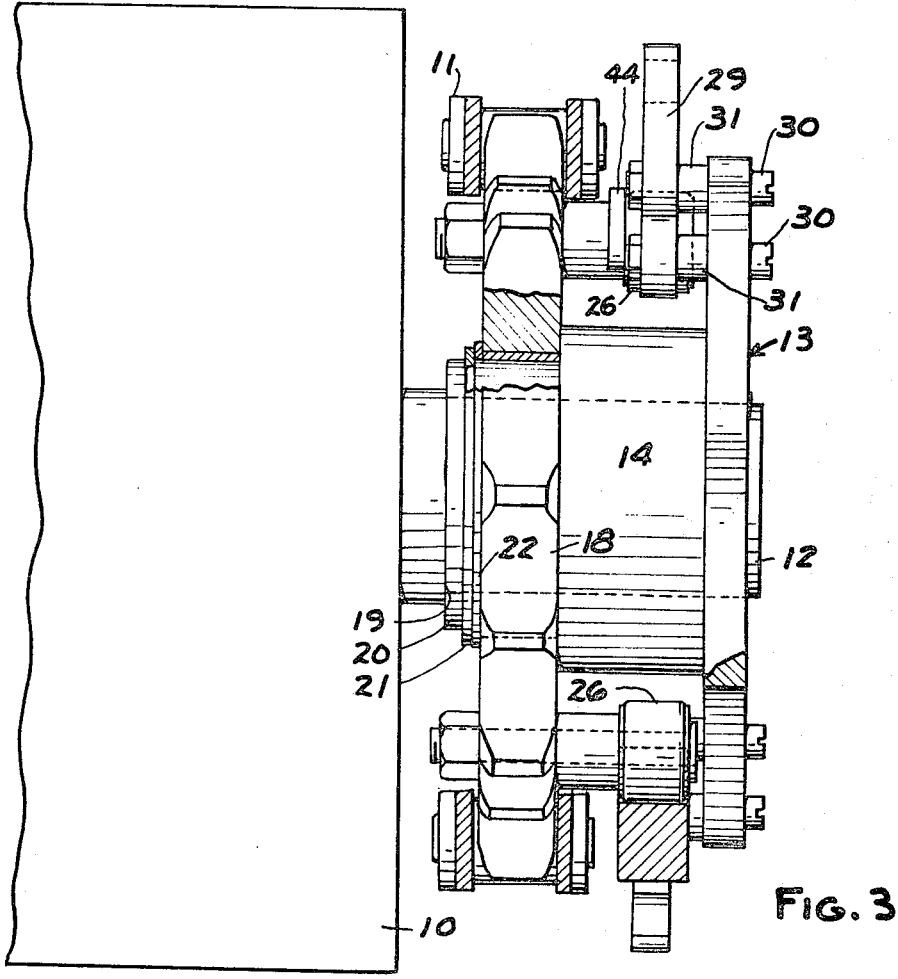
FIG. 3 is a part sectional side elevational view.
Figure 4:
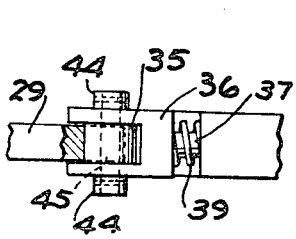
FIG. 4 is a part sectional view taken in the direction of the arrow 4 in FIG. 2.

Referring to FIGS. 1 and 3, the invention is adapted to provide a drive from a gear box 10 driven by a motor (not shown) to a conveyor chain 11. It will be readily understood that the invention is also applicable to other types of conveyors and may be used for driving intermediate chains which, in turn, drive conveyors.

As shown in FIG. 3, the gear box 10 includes an output or drive shaft 12. A drive member 13 having a hub 14 and diametrically opposed arms 15, 16 is keyed to the drive shaft 12 by a key 17 so that it is rotated directly by the drive shaft 12. A sprocket 18 over which the chain 11 is trained is rotatably mounted on the shaft 12 between the hub 14 and a shoulder 19 on the shaft. A spacer 20, washer 21 and shouldered bearing sleeve 22 are provided as shown in FIG. 3.

Figure 2:
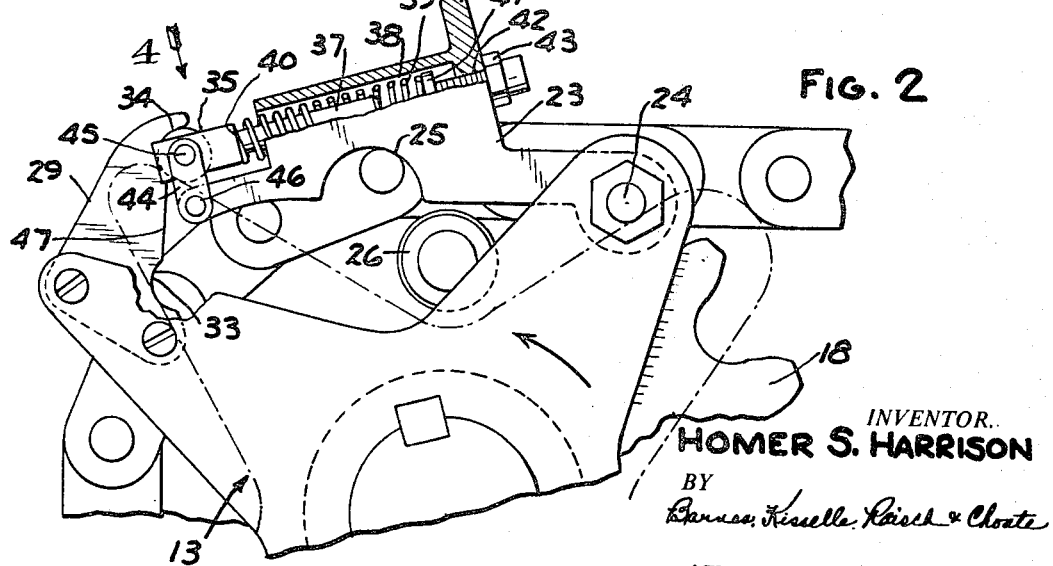
FIG. 2 is a part sectional view similar to FIG. 1 showing the parts in a different operative position.

A latch 23 is pivoted to each arm 15 by a bolt 24 and extends generally in the direction of rotation of the drive member 13. The latch 23 includes a radially inwardly facing arcuate seat or notch 25 that is adapted to engage a roller 26 on the sprocket 18. When the latches 23 are in engagement with the rollers 26 as shown in FIG. 1 and the drive member 13 is rotated, the sprocket 18 and, in turn, the chain 11 are also rotated. However, when the latches 23 are out of engagement with the rollers 26 as shown in FIG. 2, there will be no rotation of the sprocket 18 by the drive member 13. As shown in FIG. 1, each roller 26 is mounted on an axially extending pin 27 by roller bearings 28.

Each latch 23 has detent means on the end thereof which are adapted to yieldingly engage a latch cam 29 that is mounted on an arm 16 of the drive member 13 by pins 30 and is positioned thereon in proper axial position by spacers 31. The latch cam 29 includes radially spaced arcuate depressions 33, 34 that are adapted to be engaged by a cam follower roller 35 yieldingly mounted on the latch member 23. Specifically, the cam follower roller 35 is mounted by a pin 45 on a clevis 36, which has a shaft 37 extending into an opening 38 in the latch 23. A spring 39 is telescoped over the shaft 37 and engages the shoulder 40 on the clevis 36 to yeldingly urge the clevis 36 and, in turn, the cam follower roller 35 against the latch cam 29. A washer 41 engages the other end of the spring 39 and a set screw 42 is threaded into latch 23 and engages the washer to determine the force with which the spring urges the roller 35 against the latch cam 29. A lock nut 42 locks the set screw in adjusted position. Each cam follower roller 35 is guided by a pair of links 44 that are pivoted to the pin 45 on the clevis 36 at one end and to the latch 23 by a pin 46 at the other end.

Figure 5:
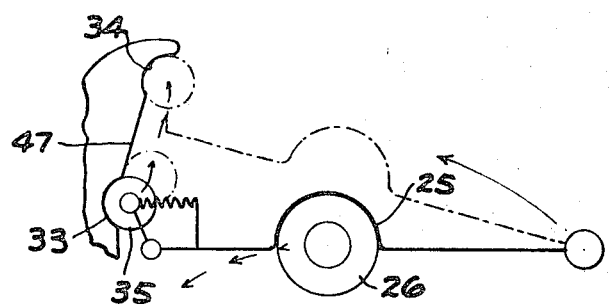
FIG. 5 is a diagram showing the manner in which a portion of the overload release operates.

When each latch 23 is in the position shown in FIG. 1, the arcuate notch 25 thereof is in engagement with the roller 26 so that when the drive member 13 is rotated, the sprocket 18 is also rotated through the engagement between the latches 23 and the rollers 26. During this time, the cam follower roller 35 is in engagement with the first seat or depression 33. If, however, an excessive load is placed upon the chain 11, the rotation of the sprocket 18 will be retarded. Continued rotation of the drive member 13 will cause the latches 23 to override the rollers 26 so that the arcuate seats 25 move out of engagement with the rollers 26 and the latches 23 are cammed radially outwardly by engagement of the arcuate seat 25 with the pin 26 (FIG. 5). This will cause the latches 23 to release the drive to the sprocket 18. The disengagement of the latches 23 is yieldingly opposed by the cam follower roller 35 which during this time moves to the dotted line position shown in the diagram of FIG. 5 and finally into engagement with the depression 34.

When the overload condition has been remedied, it is only necessary for an operator to grasp finger engaging portion 23a and push each latch 23 inwardly. This will force the cam follower rollers 35 out of engagement with the depressions 34. If the rollers 26 on the sprocket happen to be in proper position, the inclination of the surface 47 between the depressions 33, 34 is such that the spring force of the spring 39 will immediately urge the latches 23 inwardly to cause the arcuate seats 25 to engage the rollers 26. If, however, the rollers 26 are not in position for engagement with the arcuate seats 25, the spring force 38 will merely urge the latches 23 against the rollers 26. As the drive member 13 continues to rotate and as the arcuate seats 25 reach proper position for engagement with rollers 26, the springs 38, urging the rollers 35 against the cam surfaces 47, will force the latches 23 into engagement with the rollers 26 so that upon continuing rotation of the drive member 13, the sprocket and, in turn, the chain will be driven.

It has been found that the general arrangement of the depressions and mounting of the latch in a relative triangular relationship as shown in FIG. 5 results in an arrangement that necessitates a very small force to disengage the latches, compared with the driving force circumferentially of the latches. Specifically, one-tenth of the force has been found to be required.

Figure 6:
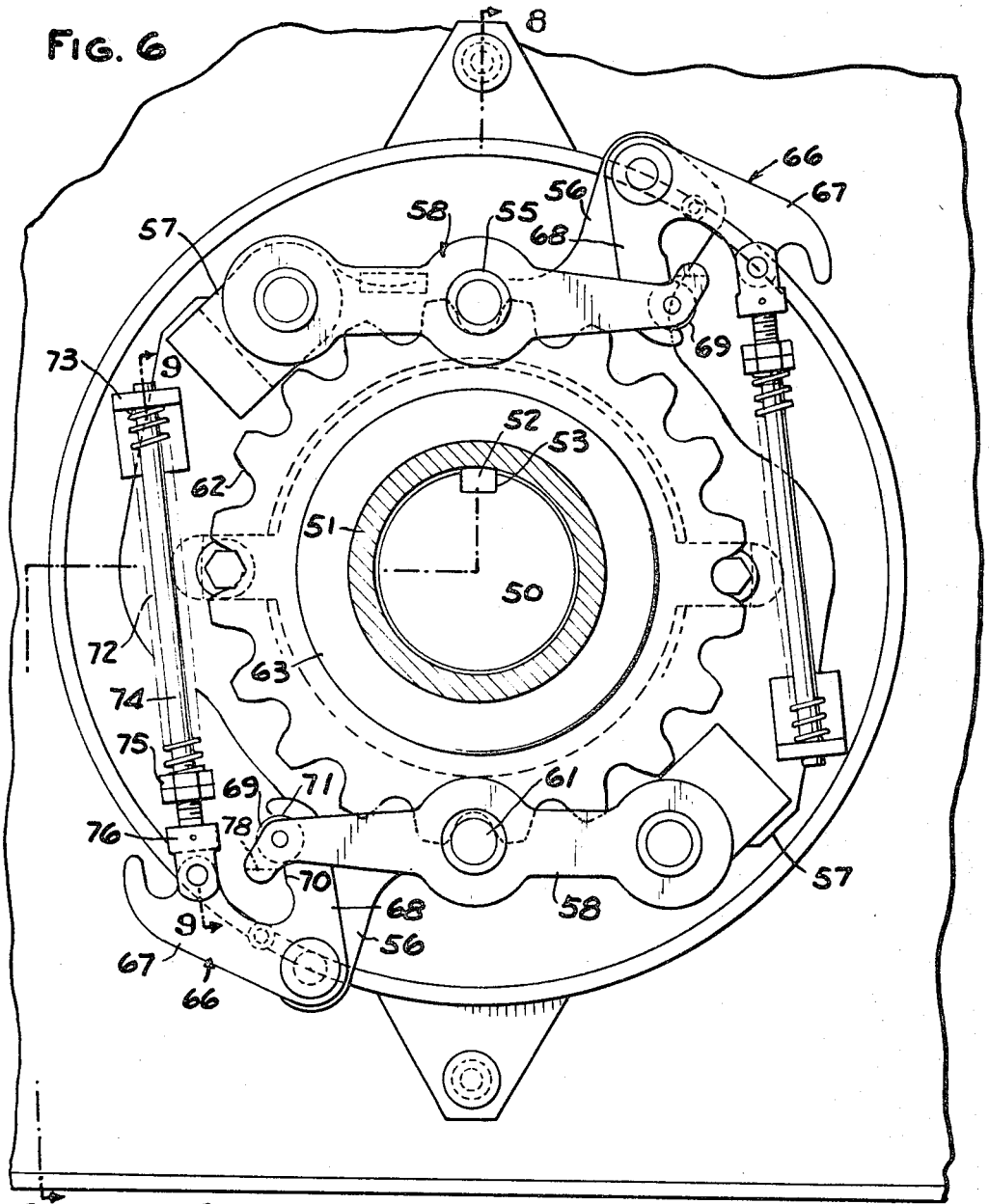
FIG. 6 is a part sectional plan view of a modified form of drive system embodying the invention.
Figure 7:
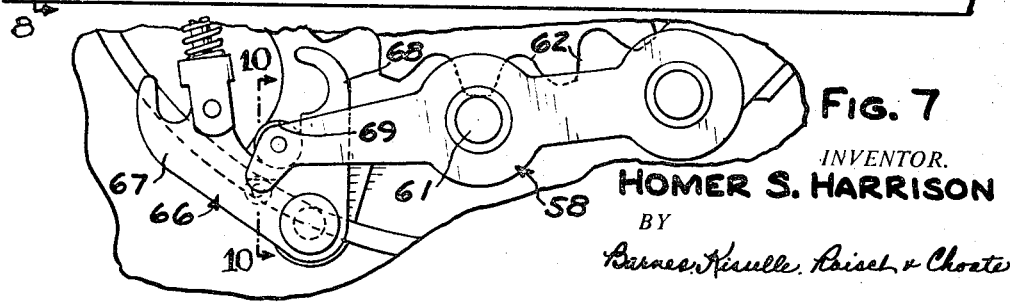
FIG. 7 is a fragmentary view of a portion of the system shown in FIG. 6 with the parts in a different relative position.

A modified form of the invention is shown in FIGS. 6–11. Referring to FIGS. 6 and 8, a drive shaft 50 is keyed to a drive ring 51 by a key 52 and keyway 53. A drive member 54 is mounted on a flange 64 of the drive ring 51 by screws 65. The drive member 54 has diametrically opposed arms 56 and 57. Latches 58 are pivoted to the arms 57. Each latch 58 comprises spaced lever arms 59, 60. A roller 61 extends through openings in the arms 59, 60 and is rotatably mounted therein by needle bearings. Each roller 61 is adapted to engage one of the circumferentially spaced pockets 62 in a driven member 63 that is rotatably mounted on drive ring 51.

A control latch 66 which has a pair of spaced arms 67, 68 is pivoted to each of the arms 56 of the drive member 54. Each latch 58 has a small roller 69 rotatably mounted on the free end thereof and engaging the surface 70 of arms 68 which has a recess or detent 71. When each latch 58 is pivoted inwardly into engagement with one of the pockets 62 of driven member 63, the roller 69 thereon is in engagement with a recess 71. A tension spring 72 is telescoped over a bolt 74 and has one end thereof engaging a bracket 73 fixed on the drive member 54 and the other end thereof engaging a nut 75 on bolt 74. A clevis 76 is fixed to the bolt 74 and is pivoted to the arm 67 of the control latch 66 (FIG. 9). This provides a force on the control latch 66 that tends to pivot it in a counterclockwise direction as viewed in FIG. 6. If, however, an excessive force is placed upon the driven member 63, then further rotation of the drive member 54 will cause the rollers 61 to be cammed outwardly out of the pockets 62. This will cause the rollers 69 on the latches 58 to move out of the detents 71 along the surfaces 70 to the position shown in FIG. 7 swinging the latches 66 in a clockwise direction to compress the spring 72.

The mechanism can be re-engaged manually by pulling outwardly on the arm 67 whereupon each roller 61 will be caused to engage one of the pockets 62 as the drive member 54 rotates. Alternatively, a cam surface 80 is provided on the lever arm 59 of latch 58 which is nearest the drive member 54 in position for engagement with the tapered end of a reset pin 81 on a reset ring 82. The reset ring 82 is adapted to be moved axially by one or more solenoids 83 to bring the tapered end 84 thereof into the path of the cam surfaces 80 as the drive member 54 with the latches 58 thereon is rotated. As each cam surface 80 engages the tapered end surface 84 of the reset pin 81, the corresponding latch 58 is cammed inwardly into position so that they will engage pockets 62 and re-establish the driving connection.

I claim:
1. For use in driving a conveyor and the like which is subject to erratic loads, the combination comprising
   a rotatable drive member,
   a driven member mounted for rotation about the axis of said drive member,
   at least one latch member pivoted to said drive member,
   said driven member having a portion thereof adapted to be engaged by said latch member when in one position,
   means on said latch member yieldingly engaging another portion of said drive member and yieldingly holding said latch member in engagement with said driven member,
   whereby when an excessive load is placed upon said driven member, continued rotation of said drive member causes said latch member to move out of engagement with the engaged portion of said driven member,
   said drive member including a cam having spaced depressions therein,
   said latch member having a cam follower thereon,
   yielding means urging said cam follower away from said latch member and against said cam whereby when said cam is in engagement with one of said depressions, said latch member is in said first position and when said cam is in engagement with the other depressions, said latch member is out of said first position.
2. The combination set forth in claim 1 wherein said drive member includes a portion which is in continued contact with said latch member both when it is in said first position and out of said first position.
3. The combination set forth in claim 1 wherein said latch member has a substantially semi-circular depression therein,
   said engaged portion of said driven member comprising a roller.
4. The combination set forth in claim 1 wherein said cam follower comprises a roller,
   at least one link pivotally mounting said roller on said latch member.
5. The combination set forth in claim 1 wherein said latch member extends away from the pivot to said drive member and in the direction of rotation.
6. The combination set forth in claim 1 wherein said driven member comprises a sprocket.
7. The combination set forth in claim 1 including a finger engaging portion on said latch member for engaging and resetting said latch member.
8. The combination set forth in claim 1 including means for adjusting the force with which said latch member is yieldingly engaged with another portion of said drive member.
9. For use in driving a conveyor and the like which is subject to erratic loads, the combination comprising
   a rotatable drive member,
   a driven member mounted for rotation about the axis of said drive member,
   at least one latch member pivoted to said drive member,
   said driven member having a portion thereof adapted to be engaged by said latch member when in one position,
   means on said latch member yieldingly engaging another portion of said drive member and yieldingly holding said latch member in engagement with said driven member,
   whereby when an excessive load is placed upon said driven member, continued rotation of said drive member causes said latch member to move out of engagement with the engaged portion of said driven member,
   the interengaging portions of said latch and driven member comprising a plurality of circumferentially spaced outwardly facing recesses on said driven member and a roller on said latch movable radially inwardly into engagement with one of said recesses.
10. The combination set forth in claim 9 including means movable into the path of said drive member for engaging said latch and moving said latch inwardly into engagement with said driven member and thereby re- establishing the driving connection between said drive member and said driven member.

11. The combination set forth in claim 9 including a control latch pivoted to said drive member,
   said control latch having a recess therein,
   said latch member having a corresponding detent member thereon for engaging said recess,
   and means yieldingly urging said control latch in position to cause said detent member to remain in said recess and thereby hold said latch member in engagement with said driven member.

12. For use in driving a conveyor and the like which is subject to erratic loads, the combination comprising
   a drive member mounted for rotation,
   a driven member mounted for rotation about the axis of said drive member,
   a pair of latch members,
   each of said latch member being pivoted to said drive member,
   said driven member having a roller thereon adapted to be engaged by said latch member,
   each said latch member having a radially inwardly facing arcuate portion intermediate its ends for engaging said roller,
   said drive member having a cam thereon adjacent the free end of each said latch member,
   said cam having spaced depressions thereon,
   a cam follower,
   means yieldingly mounting said cam follower on said latch member whereby when said cam follower is in engagement with one said depression, said latch member is in engagement with its respective roller and when said latch member is in engagement with the other depression, said latch member is out of engagement with said roller, such that when excessive loads are placed upon said driven member, continued rotation of the drive member forces said latch member to be cammed out of engagement with its respective roller.

13. The combination set forth in claim 12 wherein said means for yieldingly mounting said cam follower comprises a link pivoting said cam follower to said latch member,
   said link extending generally radially outwardly from said latch member,
   and spring means between said cam follower and said latch member yieldingly urging said cam follower toward said cam.

14. The combination set forth in claim 13 wherein said cam extends generally radially outwardly and in a direction opposite to the direction of rotation of said drive member.

15. The combination set forth in claim 13 including means for yieldingly adjusting the tension on said spring means.

16. For use in driving a conveyor and the like which is subject to erratic load, the combination comprising
   a drive member mounted for rotation,
   a driven member mounted for rotation about the axis of said drive member,
   a pair of latch members,
   each said latch member being pivoted to said drive member,
   said driven member having a plurality of circumferentially spaced arcuate seats therein about the periphery thereof,
   each said latch member having a roller thereon adapted to engage one of said seats when said latch member is swung radially inwardly,
   a control latch pivoted to said drive member and individual to each said latch member,
   said control latch having a recess therein,
   said latch member having a corresponding detent member thereon for engaging said recess,
   means yieldingly urging said control latch in position to cause said member to remain in said recess and thereby hold said latch member in engagement with its complementary seat on said driven member whereby when excessive loads are placed upon said driven member, continued rotation of the drive member forces the rollers on said latch members out of engagement with the teeth on said driven member and the detents on said latch members out of engagement with the recesses on said control latches.

17. The combination set forth in claim 16 including means movably axially of said drive member for engaging said latches and urging said latches radially inwardly into engagement with said driven member and thereby re-establishing the driving connection between the drive member and said driven member.

18. The combination set forth in claim 16 wherein said control latch comprises a pair of angularly related arms,
   said recess being on one of said arms,
   said means yieldingly urging said control latch being connected between the other of said arms and said drive member.

19. For use in driving a conveyor and the like which is subject to erratic loads, the combination comprising
   a rotatable drive member,
   a driven member mounted for rotation about the axis of said drive member,
   at least one latch member pivoted to said drive member,
   said latch member extending away from the pivot to said drive member and in the direction of rotation,
   said latch member having a radially inwardly facing portion,
   said driven member having a radially outwardly facing portion adapted to be engaged by the inwardly facing portion of said latch member when said latch member is in one position,
   means on said latch member yieldingly engaging another portion of said drive member and yieldingly holding said latch member in engagement with said driven member,
   whereby when an excessive load is placed upon said driven member, continued rotation of said drive member causes said latch member to move out of engagement with the engaged portion of said driven member.

References Cited

UNITED STATES PATENTS

| | | | |
|---|---|---|---|
| 2,781,882 | 2/1957 | Burkhardt | 192—56 |
| 2,829,749 | 4/1958 | Thomson | 192—56 |
| 2,837,190 | 6/1958 | Blakeslee | 192—56 |
| 3,103,999 | 9/1963 | Rabinow | 192—56 |
| 3,196,807 | 7/1965 | Etheridge | 104—130 X |

ARTHUR L. LA POINT, Primary Examiner.

D. F. WORTH, Assistant Examiner.

U.S. Cl. X.R.

104—178

UNITED STATES PATENT OFFICE
CERTIFICATE OF CORRECTION

Patent No. 3,418,947 December 31, 196

Homer S. Harrison

It is certified that error appears in the above identified patent and that said Letters Patent are hereby corrected as shown below:

Column 6, line 9, before "member" insert -- detent --.

Signed and sealed this 10th day of March 1970.

(SEAL)
Attest:

Edward M. Fletcher, Jr.　　　　　　　　　　WILLIAM E. SCHUYLER, JR
Attesting Officer　　　　　　　　　　　　　　Commissioner of Patents